(12) United States Patent
Wakihara et al.

(10) Patent No.: US 7,732,100 B2
(45) Date of Patent: Jun. 8, 2010

(54) SOLID POLYMER ELECTROLYTE FOR LITHIUM ION BATTERY AND LITHIUM ION BATTERY

(75) Inventors: Masataka Wakihara, Tokyo (JP); Masayuki Seki, Kawasaki (JP); Hidehisa Mita, Kawasaki (JP)

(73) Assignees: Tokyo Institute of Technology, Tokyo (JP); Nippon Nyukazai Co., Ltd., Tokyo (JP)

( * ) Notice: Subject to any disclaimer, the term of this patent is extended or adjusted under 35 U.S.C. 154(b) by 301 days.

(21) Appl. No.: 11/916,873

(22) PCT Filed: Jun. 2, 2006

(86) PCT No.: PCT/JP2006/311567

§ 371 (c)(1),
(2), (4) Date: Feb. 3, 2008

(87) PCT Pub. No.: WO2006/132339

PCT Pub. Date: Dec. 14, 2006

(65) Prior Publication Data

US 2009/0104538 A1   Apr. 23, 2009

(30) Foreign Application Priority Data

Jun. 9, 2005   (JP) ............................. 2005-169405

(51) Int. Cl.
*H01M 10/40* (2006.01)
*H01M 6/18* (2006.01)

(52) U.S. Cl. ...................................... 429/317; 429/319

(58) Field of Classification Search .................. 429/317
See application file for complete search history.

(56) References Cited

FOREIGN PATENT DOCUMENTS

| JP | 4-218261 A | 8/1992 |
|---|---|---|
| JP | 4-233161 A | 8/1992 |
| JP | 8-259698 A | 10/1996 |
| JP | 11007977 A | * 1/1999 |
| JP | 2000-276942 A | 10/2000 |
| JP | 2002-265539 A | 9/2002 |
| JP | 2003-201344 A | 7/2003 |

OTHER PUBLICATIONS

ISR for PCT/JP2006/311567 mailed Aug. 29, 2006.

* cited by examiner

*Primary Examiner*—Patrick Ryan
*Assistant Examiner*—Brent Thomas
(74) *Attorney, Agent, or Firm*—Lowe Hauptman Ham & Berner, LLP (57) ABSTRACT

The invention provides a novel lithium-ion battery electrolyte which is produced by adding an aluminate ester compound as a plasticizer in a solid polymer electrolyte. The lithium-ion battery solid polymer electrolyte of the present invention comprises a lithium ion source, an organic polymer compound, and one or more kinds of aluminate ester compounds represented by the general formula

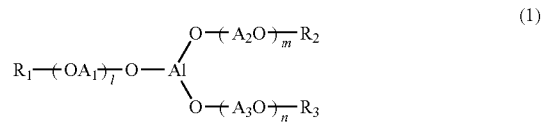

(1)

where $R_1$, $R_2$, and $R_3$ each independently represent a straight-chain or branched-chain lower alkyl group having one to eight carbon atoms, an alkenyl group having three to six carbon atoms, acryloyl, or methacryloyl; $OA_1$, $OA_2$, and $OA_3$ each independently represent an oxyalkylene group having two to four carbon atoms; l represents a number from 1 to 100; and m and n each independently represent a number from 0 to 100.

8 Claims, 6 Drawing Sheets

SOLID POLYMER ELECTROLYTE FOR LITHIUM ION BATTERY AND LITHIUM ION BATTERY

RELATED APPLICATIONS

The present application is based on International Application No. PCT/JP2006/311567 filed Jun. 2, 2006 and claims priority from Japanese Application No. 2005-169405 filed Jun. 9, 2005, the disclosure of which is hereby incorporated by reference herein in its entirety.

TECHNICAL FIELD

The present invention relates to a lithium-ion battery electrolyte which is a solid polymer, and a lithium-ion battery that uses such an electrolyte. More specifically, the invention relates to a novel lithium-ion battery electrolyte which is produced by adding an aluminate ester compound as a plasticizer to a solid polymer electrolyte.

BACKGROUND ART

In recent years, the need to further enhance the performance and reduce the size of electronic products has become stronger than ever before, and with this trend, the need for a smaller, lighter, higher capacity, and a higher energy density device has also been increasing in the field of materials for batteries that provide energy for such electronic products. Therefore, various research and development has taken place. To meet such needs, solid electrolytes have been attracting attention in recent years as new ionic conductors which are expected to replace conventional electrolytic solutions, and applying solid electrolytes to electrochemical devices such as all-solid primary batteries, secondary batteries, and capacitors has been tried. Electrochemical devices using conventional electrolytic solutions have safety and reliability problems because of solution leakage and solute seeping. Extensive studies are under way on so-called polymer electrolytes which use a polymer compound as the electrolyte in order to overcome the shortcomings associated with conventional electrolytic solutions. Polymer electrolytes are flexible and are able to conform to deformation caused by a mechanical impact or a change in electrode volume that occurs in relation to an ion-electron exchange reaction taking place between the electrode and the electrolyte. As an example of such a polymer electrolyte, U.S. Pat. No. 4,303,748 proposes a solid electrolyte produced by dissolving an alkali metal salt or an alkaline earth metal salt in polyalkylene oxide, but this solid electrolyte decreases in productivity as it takes time to dissolve the salt, and also ionic conductivity is not sufficient and contact resistance with the electrode material is high. When the ionic conductivity is not sufficient, and the contact resistance is high, a sufficient charge/discharge current density cannot be obtained, and the range of applications of the electrolyte is limited because it cannot be used in applications where a large current is required.

To overcome the shortcoming of the above solid electrolyte, there have been proposed a variety of solid electrolytes, each produced by dissolving an alkali metal salt or an alkaline earth metal salt in a polymer that has poly(metha)acrylate as the backbone and polyalkylene glycol chains as the side chains and/or crosslinking chains. One such polymer electrolyte is the solid electrolyte proposed in Japanese Examined Patent Publication No. H03-73081, which is produced by dissolving an alkali metal salt or an alkaline earth metal salt in an acryloyl-modified polyalkylene oxide, but this electrolyte still results in insufficient ionic conductivity and the mobility of cations that contribute to charging and discharging being low. When the ionic conductivity is not sufficient, and the mobility of cations is low, a sufficient charge/discharge current density cannot be obtained, and the range of applications of the electrolyte is limited because it cannot be used in applications where a large current is required, and because the movement of counter-anions may produce an undesirable secondary reaction, degrading the electrolyte as the charge/discharge cycle is repeated. To control the movement of ions that can contribute to charging and discharging in the polymer electrolyte composed principally of a ring-opening polymerization product of such alkylene oxide derivatives, Japanese Unexamined Patent Publication Nos. H11-54151 and 2001-55441 each propose an electrolyte formed from a tri-functional boron compound such as a boroxin ring that captures the counter-anions of the metal salt. Further, to enhance the ionic conductivity, Japanese Unexamined Patent Publication Nos. 2001-155771, 2001-273925, 2002-158039, and 2002-334717 each propose an electrolyte formed from a compound containing boron. However, orthoboric acid or boron oxide is used as a boron-containing compound used to obtain such compounds, and water is produced by desorption during the reaction with the compound. Furthermore, the obtained compound can be easily hydrolyzed with water, making it extremely difficult to remove the produced water. As a result, the presence of water in the resulting compound is unavoidable, and this may present a problem when using the compound as the electrolyte base material. Japanese Unexamined Patent Publication Nos. 2001-72876 and 2001-72877 also propose an electrolyte formed from a compound containing boron, but borane is used as the source of boron used to obtain the compound. However, since borane, which is a compound represented by $B_nH_m$, is highly reactive and spontaneously flammable in air, it is difficult to handle the material during manufacturing of a boron-containing compound, and when it is used in a reaction with a compound having a polymerizable group, the polymerizable group may be damaged. To solve the problems associated with the use of such boron-containing compounds, Japanese Unexamined Patent Publication No. 2003-201344 proposes to use a boric acid ester as a boron-containing compound and to manufacture a boric acid ester compound using a boric acid ester exchange reaction.

DISCLOSURE OF THE INVENTION

As described above, a boric acid ester compound has been used as a plasticizer for enhancing the ionic conductivity of a lithium-ion battery solid polymer electrolyte. However, since boron and its compounds are designated as substances (Class 1) controlled under the Pollutant Release and Transfer Register (PRTR) system, from the standpoint of environmental considerations it is desired to use a plasticizer free from boron in practical application. Furthermore, if not only thermal polymerization, but also photo-polymerization can optionally be selected as a polymerization method for the solid polymer electrolyte, it will greatly facilitate the fabrication of the lithium-ion battery. Further, in lithium-ion batteries, the major challenge is increasing the charge/discharge capacity while suppressing the degradation of the charge/discharge cycle characteristics.

The present inventors have discovered that an aluminate ester compound is extremely useful as a plasticizer for a lithium-ion battery solid polymer electrolyte, and this discovery has led to the completion of the present invention.

More specifically, according to the present invention, there is provided (a) a lithium-ion battery solid polymer electrolyte comprising a lithium ion source, an organic polymer compound, and one or more kinds of aluminate ester compounds represented by the general formula (1)

(where $R_1$, $R_2$, and $R_3$ each independently represent a straight-chain or branched-chain lower alkyl group having one to eight carbon atoms, an alkenyl group having three to six carbon atoms, acryloyl, or methacryloyl; $OA_1$, $OA_2$, and $OA_3$ each independently represent an oxyalkylene group having two to four carbon atoms; l represents a number from 1 to 100; and m and n each independently represent a number from 0 to 100).

According to the present invention, there is also provided (b) a lithium-ion battery solid polymer electrolyte as described in item (a), wherein in the formula (1), $R_1$, $R_2$, and $R_3$ are identical to each other, each representing a straight-chain or branched-chain lower alkyl group having one to eight carbon atoms; $OA_1$, $OA_2$, and $OA_3$ are identical to each other, each representing an oxyalkylene group having two to four carbon atoms; and l, m, and n are identical to each other, each representing a number from 1 to 50.

According to the present invention, there is also provided (c) a lithium-ion battery solid polymer electrolyte as described in item (b), wherein in the formula (1), $R_1$, $R_2$, and $R_3$ each represent a methyl group; $OA_1$, $OA_2$, and $OA_3$ are identical to each other, each representing an oxyethylene group; and l, m, and n are identical to each other, each representing a number from 1 to 50.

According to the present invention, there is also provided (d) a lithium-ion battery solid polymer electrolyte as described in any one of items (a) to (c), wherein the organic polymer compound contains alkyleneoxide having two to four carbon atoms as a repeating unit.

According to the present invention, there is also provided (e) a lithium-ion battery solid polymer electrolyte as described in item (d), wherein the organic polymer compound is crosslinked.

According to the present invention, there is also provided (f) a lithium-ion battery solid polymer electrolyte as described in any one of items (a) to (e), further comprising an inorganic aluminum salt.

According to the present invention, there is also provided (g) a lithium-ion battery solid polymer electrolyte as described in item (f), wherein the inorganic aluminum salt is aluminum phosphate or aluminum sulfate.

According to the present invention, there is also provided a lithium-ion battery comprising a lithium-ion battery solid polymer electrolyte as described in any one of items (a) to (g).

BEST MODE FOR CARRYING OUT THE INVENTION

When aluminate ester is added to a polymer backbone containing a supporting electrolyte, the Lewis acidity of the aluminate ester contributes to the interaction with the anions produced by the dissociation of a lithium salt, and the dissociation is promoted, while increasing the lithium ion transport number and thus enhancing the effective lithium ion conductivity. Further, since the aluminate ester plasticizes the polymer backbone, promotes the segmental motion of the lithium ions, and confers incombustibility, an all-solid polymer electrolyte having excellent thermal stability can be obtained.

A lithium-ion battery solid polymer electrolyte according to the present invention comprises a lithium ion source, an organic polymer compound, and one or more kinds of aluminate ester compounds represented by the general formula (1) shown below. Here, the wording "one or more" means that two or more kinds of aluminate ester compounds having different substituent groups can be suitably combined.

(1)

In the above formula, $R_1$, $R_2$, and $R_3$ each independently represent a straight-chain or branched-chain lower alkyl group having one to eight carbon atoms, an alkenyl group having three to six carbon atoms, acryloyl, or methacryloyl; $OA_1$, $OA_2$, and $OA_3$ each independently represent an oxyalkylene group having two to four carbon atoms; l represents a number from 1 to 100; and m and n each independently represent a number from 0 to 100.

In the compound represented by the general formula (1), examples of the straight-chain or branched-chain lower alkyl groups $R_1$, $R_2$, and $R_3$, each having one to eight carbon atoms, include a methyl group, an ethyl group, a propyl group, an isopropyl group, a butyl group, an isobutyl group, a t-butyl group, a pentyl group, an isopentyl group, a hexyl group, a 2-ethylhexyl group, etc., of which a methyl group, an ethyl group, a propyl group, and a butyl group are preferable and, among them, a methyl group and an ethyl group are particular preferable.

Examples of the alkenyl groups $R_1$, $R_2$, and $R_3$, each having three to six carbon atoms, include an allyl group, a 2-methylallyl group, a 3,3-dimethylallyl group, a 2,3,3,-trimethylallyl group, etc., of which an allyl group and a 2-methylallyl group are preferable and, among them, an allyl group is particularly preferable.

For the acryloyl or methacryloyl groups $R_1$, $R_2$, and $R_3$, the methacryloyl group is particularly preferable.

$R_1$, $R_2$, and $R_3$ are preferably straight-chain or branched-chain lower alkyl groups each having one to eight carbon atoms, more preferably methyl, ethyl, propyl, or butyl groups, and particularly preferably methyl or ethyl groups. Further preferably, $R_1$, $R_2$, and $R_3$ are identical to each other.

For the oxyalkylene groups $OA_1$, $OA_2$, and $OA_3$, an oxyethylene group or oxypropylene group is preferable. Further preferably, $OA_1$, $OA_2$, and $OA_3$ are identical to each other.

l, m, and n indicate the degrees of polymerization of the oxyalkylene groups $OA_1$, $OA_2$, and $OA_3$, respectively. l represents a number from 1 to 100, preferably from 1 to 50, and particularly preferably from 2 to 50. m and n each independently represent a number from 0 to 100, preferably from 1 to 50, and particularly preferably from 2 to 50. The mode of polymerization of the oxyalkylene groups may be homopolymerization, random polymerization, or block polymerization.

The aluminate ester compound represented by general formula (1) is obtained by ester exchange reaction between a trialkyl aluminate ester and a polyalkylene glycol derivative. The polyalkylene glycol derivative is represented by the general formula $R_1$-$(OA_1)_l$-OH, $R_2$-$(OA_2)_m$-OH, and $R_3$-$(OA_3)_n$-OH. Here, $R_1$, $R_2$, $R_3$, $OA_1$, $OA_2$, $OA_3$, l, m, and n are the same as previously defined.

The alkyl group in the trialkyl aluminate ester used as a raw material in the manufacture of the aluminate ester compound is a straight-chain or branched-chain lower alkyl group having one to eight carbon atoms, examples including a methyl group, an ethyl group, a propyl group, an isopropyl group, a butyl group, an isobutyl group, a t-butyl group, a pentyl group, an isopentyl group, a hexyl group, a 2-ethylhexyl group, etc., of which a methyl group, an ethyl group, a propyl group, an isopropyl group, a butyl group, an isobutyl group, and a t-butyl group are preferable and, among them, an isopropyl group is particular preferable.

The ester exchange reaction between the trialkyl aluminate ester and the polyalkylene glycol derivative is performed under heat. Since the ester exchange reaction is an equilibrium reaction, from the standpoint of promoting the reaction it is preferable to perform the reaction while removing alcohol being produced during the reaction, from the reaction system. A known method is used for removal, examples including a method for removing the alcohol by distillation and a method for removing the alcohol by adsorbing it onto an adsorbent such as a molecular sieve. The reaction temperature and the distillation pressure vary depending on the kind of the trialkyl aluminate ester and the polyalkylene glycol derivative used as feedstocks, but usually, the reaction temperature is from room temperature to 250° C., preferably from 50 to 200° C., and particularly preferably from 50 to 150° C. The distillation pressure is from atmospheric pressure to 0.5 mmHg, preferably from atmospheric pressure to 5 mmHg, and particularly preferably from atmospheric pressure to 10 mmHg.

Here, there is no need to use a reaction solvent, but if it is desirable to use a solvent, any suitable solvent can be used, as long as it does not react with the aluminate ester compound produced; examples include aromatic hydrocarbons such as toluene, xylene, and benzene, aliphatic hydrocarbons such as hexane, heptane, and octane, alicyclic hydrocarbons such as cyclohexane and cycloheptane, cyclic ethers such as dioxane and tetrahydrofuran, ethers such as diethyl ether and isopropyl ether, glymes such as ethylene glycol dimethyl ether, diethylene glycol dimethyl ether, and triethylene glycol dimethyl ether, and esters such as ethyl acetate and methyl acetate, of which aromatic hydrocarbons such as toluene, xylene, and benzene, aliphatic hydrocarbons such as hexane, heptane, and octane, alicyclic hydrocarbons such as cyclohexane and cycloheptane, cyclic ethers such as dioxane and tetrahydrofuran, ethers such as diethyl ether and isopropyl ether, and glymes such as ethylene glycol dimethyl ether, diethylene glycol dimethyl ether, and triethylene glycol dimethyl ether are preferable and, among them, aromatic hydrocarbons such as toluene, xylene, and benzene, aliphatic hydrocarbons such as hexane, heptane, and octane, and alicyclic hydrocarbons such as cyclohexane and cycloheptane are particularly preferable.

In the ester exchange reaction between the alkenyloxy, acryloyloxy, or methacryloyloxy polyalkylene glycol and the trialkyl aluminate ester, a polymerization inhibitor may be added to prevent the polymerization of the alkenyloxy, acryloyloxy, or methacryloyloxy polyalkylene glycol as the feedstock and the aluminate ester compound as the reaction product. Examples of the polymerization inhibitor include hydroquinone compounds, steric hindrance phenols, steric hindrance amines, and hydroxyamine derivatives. Examples of the hydroquinone compounds include hydroquinone and hydroquinone monomethyl ether; examples of the steric hindrance phenols include 4-methyl-2,6-di-t-butylphenol and 2,4-dimethyl-6-t-butylphenol; examples of the steric hindrance amines include 2,2,6,6-tetramethylpiperidine-N-oxyl and 4-hydroxy-2,2,6,6, -tetramethylpiperidine-N-oxyl; and examples of the hydroxyamine derivatives include N,N-diethylhydroxylamine, etc. Two or more kinds of polymerization inhibitors may be used in a suitable combination.

The reaction time varies depending on the reaction temperature and the feedstock compound, but usually the reaction time is from 1 to 30 hours, preferably from 2 to 20 hours, and particularly preferably from 2 to 10 hours.

The isolation of the thus produced aluminate ester compound represented by general formula (1) is done using a known method; for example, when the reaction yield is high, and refining or decolorizing is not particularly needed, filtering will suffice for the purpose. When a solvent was used, the compound can be isolated by evaporating the solvent after filtering. Refining or decolorizing may be performed as needed. Refining is performed using a known method such as a column chromatography. Decolorizing is performed using a known method, for example, a method that uses an adsorbent such as activated carbon, silica, or Kyoward.

The amount of the aluminate ester compound added in the solid polymer electrolyte according to the present invention is usually in the range of 1 to 10 parts by weight, preferably 2 to 7 parts by weight, per part by weight of an organic polymer compound to be described later. If the amount of the aluminate ester compound added is smaller than 1 part by weight, the desired Lewis acidity and plasticizing ability cannot be obtained, resulting in an insufficient lithium ion conductivity. Conversely, if the amount of the aluminate ester compound added is larger than 10 parts by weight, the formability of an electrolyte film to be described later is impaired.

The lithium-ion battery solid polymer electrolyte according to the present invention includes an organic polymer compound. Any suitable organic polymer compound may be used, as long as the organic polymer compound is one that achieves the desired lithium ion conductivity and that renders the polymer electrolyte solid. For example, an organic polymer compound containing alkyleneoxide as a repeating unit, such as described in Japanese Unexamined Patent Publication Nos. 2001-155771, 2001-273925, 2002-158039, 2002-334717, and 2003-201344, can be used. It is preferable to use a crosslinking polymer in order to obtain a solid polymer electrolyte having high strength. For example, a polymer obtained by copolymerizing polyethylene glycol dimethacrylate as a crosslinking polymer with methoxypolyethylene glycol methacrylate as a polymer for securing the flexibility of the electrolyte and the retentivity of the plasticizer can be advantageously used.

The lithium-ion battery solid polymer electrolyte according to the present invention further includes a lithium ion source. The lithium ion source used in the present invention can be mixed in a desired proportion with respect to the organic polymer compound used in the present invention. Preferably, the lithium ion source used in the present invention is mixed in an amount such that the total number of moles of oxyalkylene units contained in the organic polymer compound used in the present invention is from 2 to 30 per mole of the lithium metal contained in the lithium ion source, more preferably the total number of moles of the oxyalkylene units is from 2 to 20 per mole of the lithium metal, and further preferably the total number of moles of the oxyalkylene units is from 2 to 15 per mole of the lithium metal, from the standpoint of reducing the glass transition temperature of the organic polymer compound which contributes to enhancing the ionic conductivity. Examples of the lithium ion source include $LiClO_4$, $LiAsF_6$, $LiPF_6$, $LiBF_4$, $LiCF_3SO_3$, $Li(CF_3SO_2)_2N$, $Li(C_2F_5SO_2)_2N$, $Li(CF_3SO_2)_3C$, $LiI$, and $LiSCN$.

To increase the charge/discharge capacity and to suppress the degradation of the charge/discharge characteristics, an inorganic aluminum salt can be added to the lithium-ion battery solid polymer electrolyte of the present invention. It is believed that the inorganic aluminum salt added to the electrolyte inhibits the formation of a passivation layer by modifying the positive electrode surface that contacts the solid polymer electrolyte film. Examples of such inorganic aluminum salts include aluminum phosphate ($AlPO_4$), aluminum sulfate ($Al_2(SO_4)_3$), aluminum chloride ($AlCl_3$), and aluminum iodide ($AlI_3$). The amount of the inorganic aluminum salt added is 0.001% by mass or greater, preferably 0.003% by mass or greater, relative to the aluminate ester compound. Some inorganic aluminum salts are not easily soluble in the target electrolytic solution, but such inorganic aluminum salts can also be used, provided that an inorganic aluminum salt of an amount not smaller than the above lower limit is contained in the supernatant gathered by removing insolubles after letting the electrolytic solution with the inorganic aluminum salt added thereto stand for a predetermined period of time. There is no specific upper limit to the amount of the inorganic aluminum salt to be added for the purpose of inhibiting the formation of a passivation layer, but if it is added in an amount greater than 10% by mass, no further improvement can be expected. Therefore, the practical upper limit is about 10% by mass.

Further, if desired, an ionically conductive or ferroelectric salt or glass powder or the like can be added to the lithium-ion battery solid polymer electrolyte of the present invention. Examples of such salts or glass powder include $SnO_2$, $BaTiO_3$, $Al_2O_3$, $Li_2O.3B_2O_3$, and $LaTiO_3$.

A liquid electrolyte base material, such as ethylene carbonate, propylene carbonate, butylene carbonate, dimethyl carbonate, diethyl carbonate, methylethyl carbonate, tetrahydrofuran, γ-butyrolactone, dimethoxyethane, 2-methyltetrahydrofuran, 1,3-dioxolane, formamide, dimethylformamide, nitromethane, methyl formate, or methyl acetate, may be mixed as desired if it does not impair the effect of the present invention.

The solid polymer electrolyte of the present invention can be prepared by various methods. The method of preparation is not limited to any specific method; for example, since the organic polymer compound used in the present invention is soluble in many low-boiling organic solvents, a solution can be prepared by dissolving the organic polymer compound, lithium ion source, aluminate ester compound, and, if necessary, a polymerization initiator, into a low-boiling organic solvent, and a solid polymer electrolyte thin film having good mechanical strength can be produced by casting the solution and by thermally polymerizing the polymerizable organic compound while removing the low-boiling solvent. Further, a solution can be prepared by dissolving the organic polymer compound, lithium ion source, and aluminate ester compound into a low-boiling organic solvent, and a polymer electrolyte thin film can be produced by casting the solution and removing the low-boiling solvent. It is also possible to produce a thin film by polymerizing the polymerizable organic compound by subjecting it to electromagnetic waves such as ultraviolet, visible, or electron radiations.

By combining the solid polymer electrolyte of the present invention with prior known anode and cathode materials, a lithium-ion battery achieving high ionic conductivity and excellent charge/discharge cycle characteristics, while ensuring a high degree of safety, can be obtained. Here, the solid polymer electrolyte thin film after polymerization may be bonded to the anode and cathode materials, or the electrolyte before polymerization may first be combined with the anode and cathode materials in an integral fashion and then be polymerized. In particular, when adding an inorganic aluminum salt to the electrolyte in order to increase the charge/discharge capacity of the lithium-ion battery and suppress the degradation of the charge/discharge cycle characteristics, it is preferable that the liquid electrolyte containing the inorganic aluminum salt and combined with the electrode materials in an integral fashion be left standing for a predetermined period of time before polymerization to allow the inorganic aluminum salt to be sufficiently adsorbed on the electrode surfaces.

WORKING EXAMPLES

The present invention will be described in detail below with reference to working examples.

Test Example 1

Method for Measuring the Concentration of Aluminum in Aluminate Ester Compound

A sample is prepared in a 200-mL beaker so that it contains 0.008 mg (0.3 mM) of aluminum. Then, 60 mL of water and 0.5 mL of concentrated hydrochloric acid are added to dissolve the sample. After adjusting the pH to about 3 by applying aqueous ammonia, a 0.01M EDTA-2Na standard solution is added in an amount of 50 mL, and the resulting solution is boiled for two minutes. After allowing the solution to cool, the pH is adjusted to 5 to 6 by adding hexamethylene tetramine crystals little by little. Then, a few drops of 0.1 w/v % xylenol orange solution are added as an indicator, and titration is performed using a 0.01M zinc standard solution. The point at which the solution turns from yellow to slightly reddish is taken as the endpoint. The concentration of aluminum is obtained from the following equation.

$$Aluminum(\%) = [(B-A) \times 0.01 \times 27 \times f \times 100] \div [Sample(g) \times 1000]$$

A: 0.01M zinc standard solution (mL) required for the titration of the sample
B: 0.01M zinc standard solution (mL) required for the titration of blank
f: Factor of the 0.01M zinc standard solution Manufacturing Example 1

Manufacture of Aluminate Triester from Methoxytriethylene Glycol (Molecular Weight: 164, Chain Length of Ethyleneoxy Group: 3)

100 grams (0.61 mole) of methoxytriethylene glycol (molecular weight: 164, product name: MTG manufactured by Nippon Nyukazai, Co., Ltd.) and 41.5 grams (0.20 mole) of aluminum isopropoxide (manufactured by Tokyo Chemical Industry, Co., Ltd.) were prepared and were heated in a nitrogen stream to 110° C. with stirring. The aluminum isopropoxide was dissolved and, while holding it at the above temperature for one hour, the ester exchange was allowed to proceed. After that, liberated isopropyl alcohol was removed at the atmospheric pressure and at 2.67 kPa (20 mmHg). After cooling followed by filtering, 97 grams of the intended aluminate ester compound was obtained with a yield of 92%.

Aluminum concentration (wt %): Measured value 5.11, Theoretical value 5.23.

Figure 1:
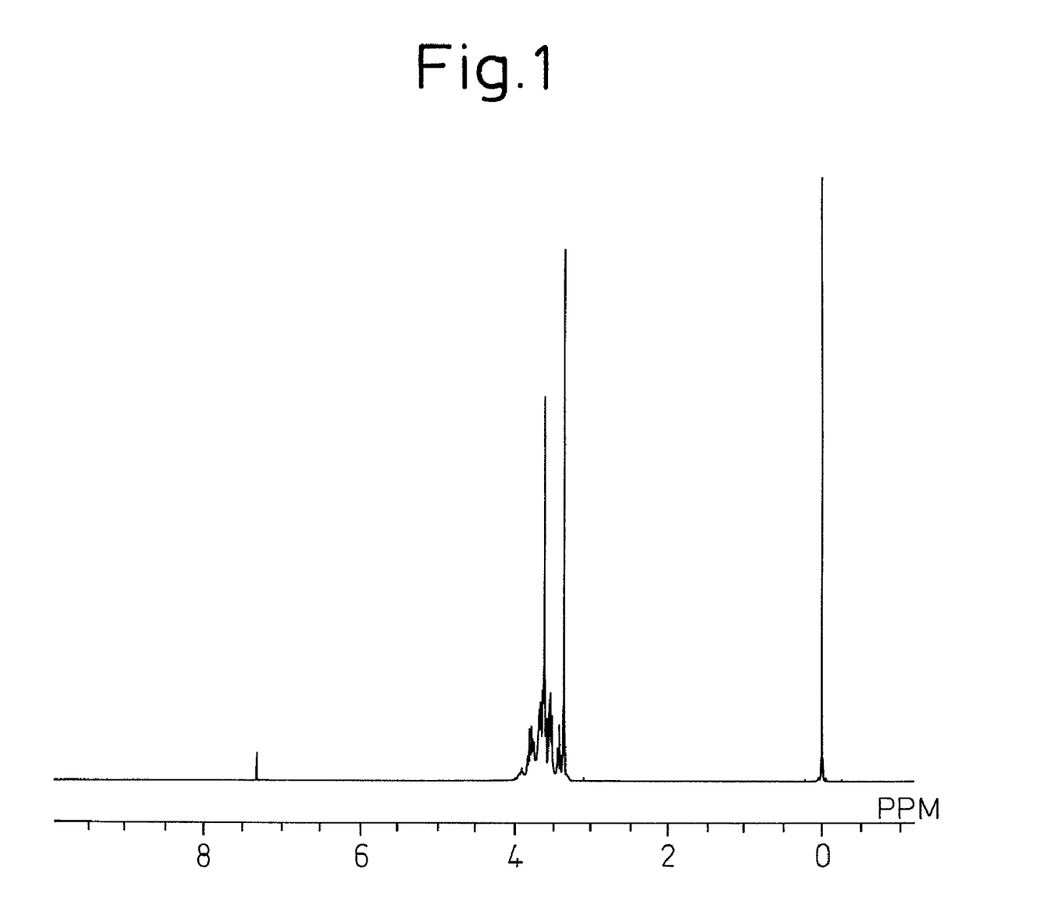
FIG. 1 is a diagram showing an NMR spectrum of aluminate triester of methoxytriethylene glycol manufactured in a first manufacturing example.

FIG. 1 shows an NMR (270 MHz, $CDCl_3$, tetramethylsilane as internal standard).

Figure 2:
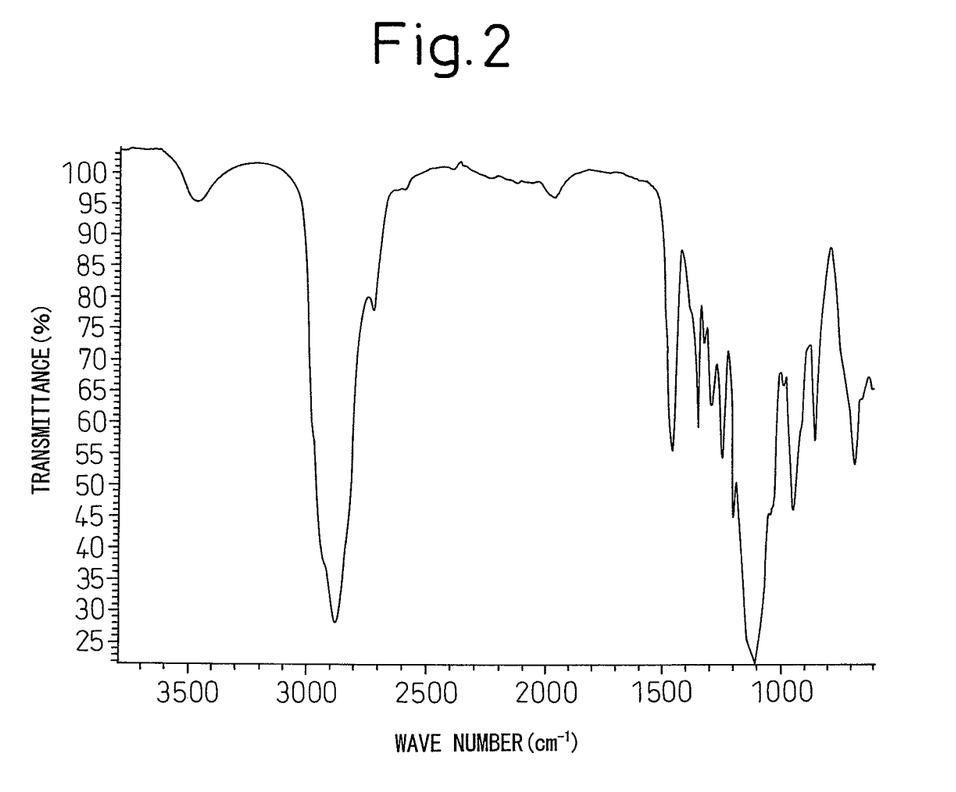
FIG. 2 is a diagram showing an infrared absorption spectrum of the aluminate triester of methoxytriethylene glycol manufactured in the first manufacturing example.

FIG. 2 shows an FT-IR (Neat).

Manufacturing Example 2

Manufacture of Aluminate Triester from Methoxypolyethylene Glycol (Average Molecular Weight: 428, Chain Length of Ethyleneoxy Group: 9)

100 grams (0.23 mole) of methoxypolyethylene glycol (average molecular weight: 428, product name: MPG-130 manufactured by Nippon Nyukazai, Co., Ltd.) and 15.9 grams (0.07 mole) of aluminum isopropoxide (manufactured by Tokyo Chemical Industry, Co., Ltd.) were prepared and were heated in a nitrogen stream to 110° C. with stirring. The aluminum isopropoxide was dissolved and, while holding it at the above temperature for one hour, the ester exchange was allowed to proceed. After that, liberated isopropyl alcohol was removed at the atmospheric pressure and at 2.67 kPa (20 mmHg). After cooling followed by filtering, 93 grams of the intended aluminate ester compound was obtained with a yield of 90%.

Aluminum concentration (wt %): Measured value 2.04, Theoretical value 2.06.

Manufacturing Example 3

Manufacture of Aluminate Triester from Methoxypolyethylene Glycol (Average Molecular Weight: 692, Chain Length of Ethyleneoxy Group: 15)

100 grams (0.15 mole) of methoxypolyethylene glycol (average molecular weight: 692, product name: MPG-081 manufactured by Nippon Nyukazai, Co., Ltd.) and 9.8 grams (0.05 mole) of aluminum isopropoxide (manufactured by Tokyo Chemical Industry, Co., Ltd.) were prepared and were heated in a nitrogen stream to 110° C. with stirring. The aluminum isopropoxide was dissolved and, while holding it at the above temperature for one hour, the ester exchange was allowed to proceed. After that, liberated isopropyl alcohol was removed at the atmospheric pressure and at 2.67 kPa (20 mmHg). After cooling followed by filtering, 91 grams of the intended aluminate ester compound was obtained with a yield of 90%.

Aluminum concentration (wt %): Measured value 1.27, Theoretical value 1.29.

Working Example 1

In a dry box filled with an argon atmosphere, the aluminate ester compound (n=3) (in a prescribed mass ratio) obtained in the first manufacturing example and $LiN(CF_3SO_2)_2$ (LiTFSI) as the lithium source (in an amount such that the molar ratio of the lithium ions to all the ethyleneoxide chains was 1/8, i.e., Li/EO=1/8) were mixed with respect to 0.5 gram of polyethylene glycol (600) dimethacrylate (product name: NK ESTER 14G manufactured by Shin-Nakamura Chemical Co., Ltd.) and the same amount of methoxypolyethylene glycol (4000) methacrylate (product name: NK ESTER M-900G manufactured by Shin-Nakamura Chemical Co., Ltd.), and 5 mg of azo-isobutyro-nitrile (AIBN) as a polymerization initiator was added to the mixture, which was then poured over a Teflon (registered trademark) plate and heated at 80° C. for two hours, to obtain a transparent solid polymer electrolyte film.

Figure 3:
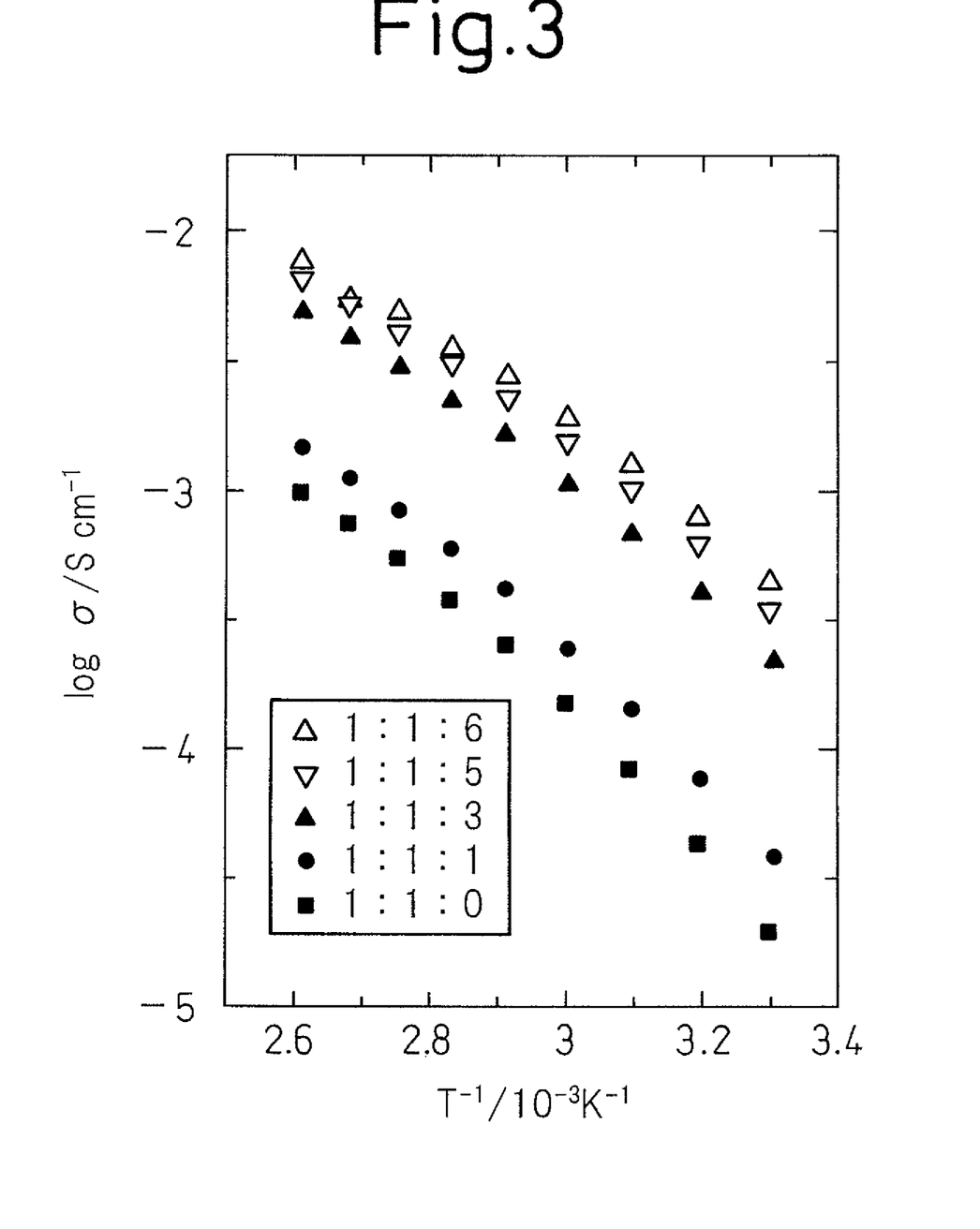
FIG. 3 is a diagram showing the ionic conductivity of a solid polymer electrolyte obtained in a first working example.

The ionic conductivity of each electrolyte film obtained was measured by an AC complex impedance method (frequency: 5 Hz to 13 MHz) over a temperature range of 110 to 30° C. FIG. 3 shows a logarithmic plot of the ionic conductivity as a function of the reciprocal of absolute temperature for the various electrolyte films (thickness 0.8 mm) obtained by varying the ratio of (NK ESTER 14G):(NK ESTER M-900G):(ALUMINATE ESTER (n=3))=1:1:X+LiTFSI (Li/EO=1/8). As can be seen from FIG. 3, the ionic conductivity increases as the amount of the aluminate ester compound added is increased. The maximum amount of the aluminate ester compound added that enabled the electrolyte film to stand by itself was given by the ratio of (NK ESTER 14G):(NK ESTER M-900G):(ALUMINATE ESTER (n=3))=1:1:6. The ionic conductivity of the electrolyte film with this maximum amount was $10^{-3.4}$ S·cm$^{-1}$ at room temperature and $10^{-3.2}$ S·cm$^{-1}$ at 60° C. This ionic conductivity is about one and a half orders of magnitude higher than the ionic conductivity of the electrolyte film with no aluminate ester compound added.

Working Example 2

Figure 4:
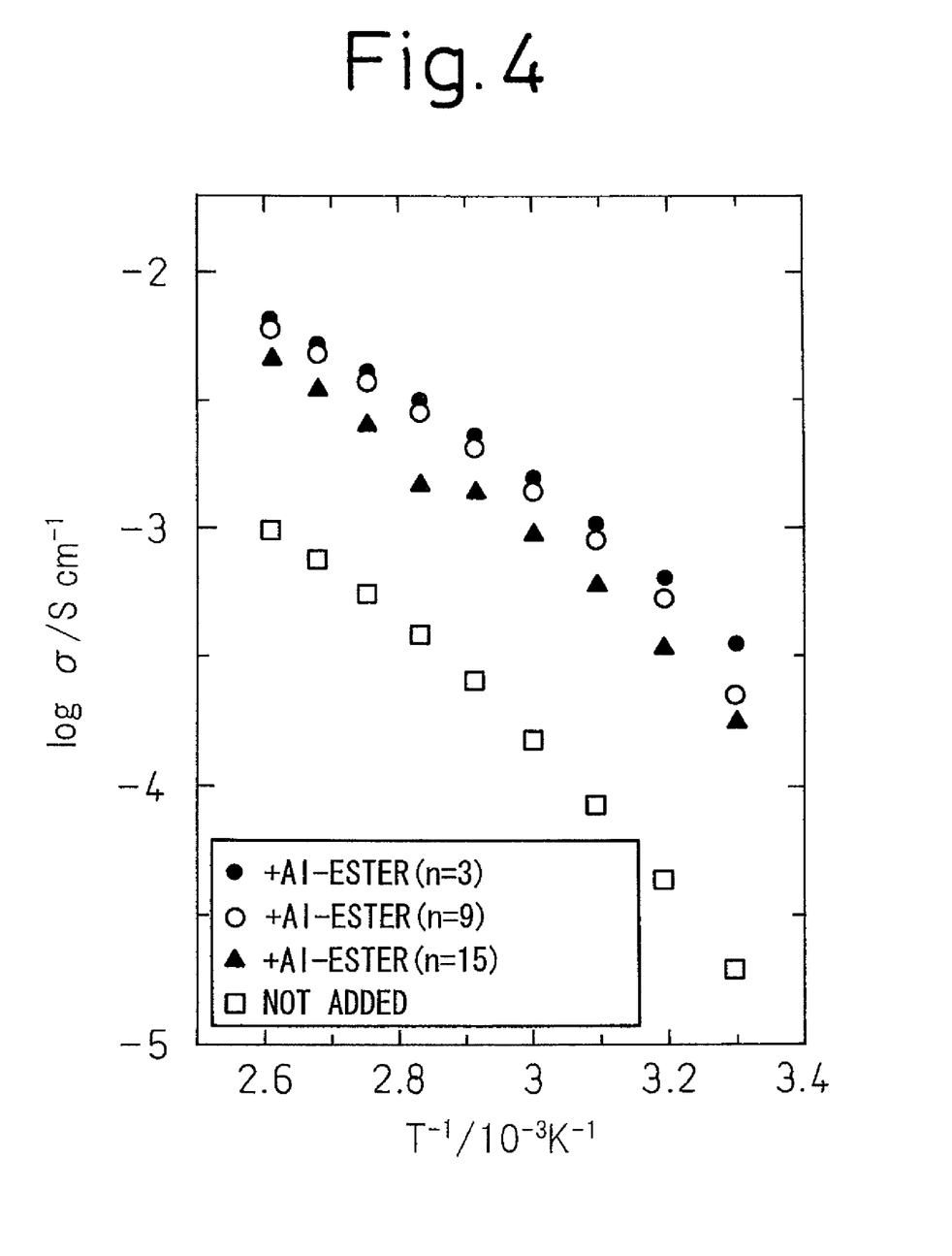
FIG. 4 is a diagram showing the ionic conductivity of a solid polymer electrolyte obtained in a second working example.

Solid polymer electrolyte films were fabricated in the same manner as in the first working example, except that the mass ratio of (NK ESTER 14G):(NK ESTER M-900G):(ALUMINATE ESTER) was fixed to 1:1:5 and that the aluminate ester compounds obtained in the first manufacturing example (n=3), the second manufacturing example (n=9), and the third manufacturing example (n=15) were respectively used. FIG. 4 shows a logarithmic plot of the ionic conductivity as a function of the reciprocal of absolute temperature for n=3, n=9, and n=15. As can be seen from FIG. 4, the ionic conductivity is the highest for n=3. This is presumably because the segmental motion of the polymer is the greatest in the case of n=3, serving to increase the ionic conductivity.

Figure 5:
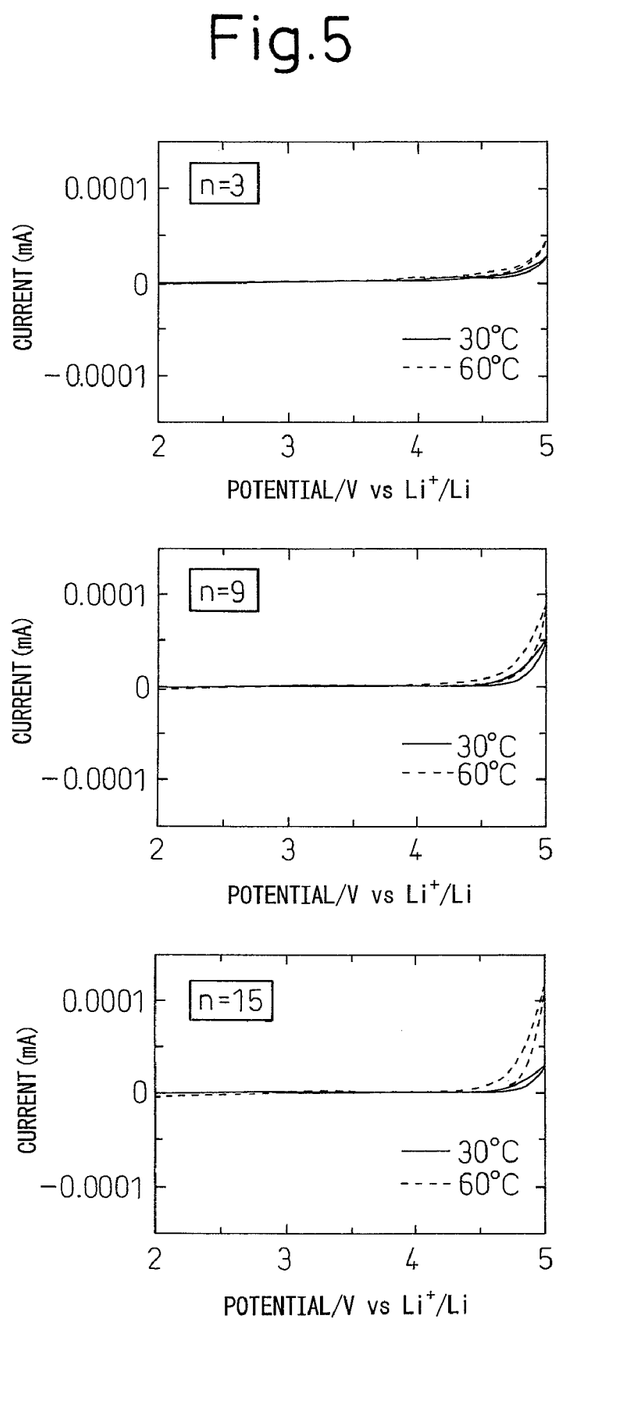
FIG. 5 is a diagram showing a cyclic voltammogram of the solid polymer electrolyte obtained in the second working example.

FIG. 5 shows cyclic voltammogram (CV) curves obtained by measuring the three solid polymer electrolyte films fabricated in the second working example. A Solartron SI 1287 was used as the CV measuring equipment. The oxidation voltage was measured to be 4.6 V at room temperature and about 4.4 V at 60° C. for all the cases of n=3, n=9, and n=15. This shows that these solid polymer electrolyte films can operate stably within the usual battery operating voltage range of 3 to 4.3 V.

Working Example 3

2.5 grams of LiTFSI (lithium trifluorosulfonylimide manufactured by Stella Chemifa Corporation) (2.38 moles of lithium per mole of aluminum) was dissolved at 60° C. into 5.0 grams of the aluminate ester compound (n=9) obtained in the second manufacturing example. In the resulting solution, 1 gram of methoxypolyethylene glycol #400 monomethacrylate (molecular weight: 496, chain length of ethyleneoxy group: 9, product name: MPG-130MA manufactured by Nippon Nyukazai, Co., Ltd.) and 1 gram of polyethylene glycol #600 dimethacrylate (molecular weight: 736, chain length of ethyleneoxy group: 14, product name: NK ESTER 14G manufactured by Shin-Nakamura Chemical Co., Ltd.) were mixed as polymer backbones at room temperature. In this mixture, 0.5% by mass of Michler's ketone (4,4'-Bis(dimethylamino)benzophenone manufactured by Wako Pure Chemical Industries, Ltd.) was dissolved as a photo-polymerization initiator. The resulting electrolytic solution was poured into a Teflon (registered trademark) pool, and was subjected to photo-polymerization at room temperature in a nitrogen stream by using ultraviolet radiation of 365 nm (radiation intensity of 320 µW/cm$^2$). Ten minutes after the initiation of the radiation, the surface began to harden, and after 30 minutes, a solid polymer electrolyte film (thickness 1 mm) hardened throughout was obtained.

Comparative Example 1

As an example to be compared with the third working example, a study was conducted on the photo-polymerizability when a boric acid ester compound was used instead of the aluminate ester compound. 2.5 grams of LiTFSI (lithium trifluorosulfonylimide manufactured by Stella Chemifa Corporation) (2.36 moles of lithium per mole of boron) was dissolved at 60° C. into 5.0 grams of the boric acid ester compound (chain length of ethyleneoxy group=9) synthesized in accordance with the description given in Japanese Unexamined Patent Publication No. 2003-201344. In the resulting solution, 1 gram of methoxypolyethylene glycol #400 monomethacrylate (molecular weight: 496, chain length of ethyleneoxy group: 9, product name: MPG-130MA manufactured by Nippon Nyukazai, Co., Ltd.) and 1 gram of polyethylene glycol #600 dimethacrylate (molecular weight: 736, chain length of ethyleneoxy group: 14, product name: NK ESTER 14G manufactured by Shin-Nakamura Chemical Co., Ltd.) were mixed as polymer backbones at room temperature. In this mixture, 0.5% by mass of Michler's ketone (4,4'-Bis(dimethylamino)benzophenone manufactured by Wako Pure Chemical Industries, Ltd.) was dissolved as a photo-polymerization initiator. The resulting electrolytic solution was poured into a Teflon (registered trademark) pool, and was subjected to photo-polymerization at room temperature in a nitrogen stream by using ultraviolet radiation of 365 nm (radiation intensity of 320 µW/cm$^2$). Even after 30 minutes had elapsed from the initiation of the polymerization, the polymerization did not start and the solution remained in liquid form.

As can be seen from a comparison between the third working example and the first comparative example, the electrolyte containing the aluminate ester compound is superior in photo-polymerizability to the prior art electrolyte containing the boric acid ester compound. In this way, since the solid polymer electrolyte containing the aluminate ester compound according to the present invention can be manufactured not only by thermal polymerization but also by photo-polymerization, it greatly facilitates the fabrication of the lithium-ion battery.

Working Example 4

This example illustrates how the charge/discharge capacity and cycle characteristics of the lithium-ion battery solid polymer electrolyte according to the present invention are improved by adding an inorganic aluminum salt.

An electrolytic solution was prepared by dissolving lithium perchlorate (LiClO$_4$) at a concentration of 1 mole/L into the aluminate ester compound (n=9) obtained in the second manufacturing example. The electrolytic solution was thoroughly impregnated into a filter paper (5 C manufactured by Toyo Filter Paper Co., Ltd.). The filter paper was placed on a positive electrode containing olivine particles (LiFePO$_4$), and a lithium foil as a negative electrode was placed on the filter paper, thereby fabricating a coin cell measuring 20 mm in diameter and 2 mm in thickness. After the fabrication, the coin cell was left standing for 12 hours, allowing the components of the electrolytic solution to be sufficiently adsorbed on the surface of the positive electrode.

When fabricating the coin cell as described above, to confirm the effect of the inorganic aluminum salt, samples were produced by varying the amount of aluminum phosphate to be added to the electrolytic solution, one with an amount of 0.003% by mass, another with an amount of 1% by mass, and the other with an amount of 5% by mass, and comparisons were made with a sample with no aluminum phosphate added.

The cycle characteristics of each of the thus fabricated coin cells were measured by performing a test under conditions of a measuring temperature of 60° C., current density of 0.1 C, and charge/discharge end voltage of 2.5 V to 3.8 V. The results of the measurements are shown in FIG. 6.

Figure 6:
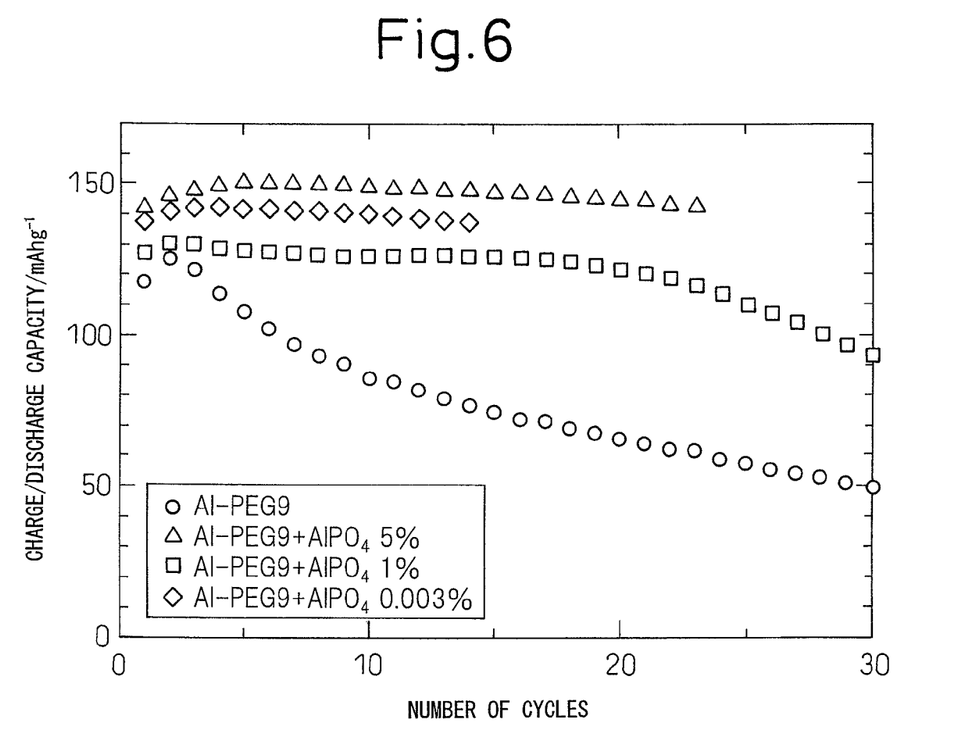
FIG. 6 is a diagram showing the charge/discharge cycle characteristics of a coin cell obtained in a fourth working example.

As can be seen from FIG. 6, the charge/discharge capacity and cycle characteristics of each sample produced by adding the aluminum phosphate to the electrolytic solution are significantly improved over the sample with no aluminum phosphate added. The reason, although not yet confirmed, is believed to be that the aluminum phosphate modifies the surface of the positive electrode and thereby inhibits the formation of a passivation layer that interferes with the capturing of lithium ions. It should also be noted that the effect of the aluminum phosphate was dramatic even when it was added at an extremely low concentration such as 0.003% by mass. This working example is not one specifically concerned with the case where the electrolytic solution is hardened or gelled by using an organic polymer compound, but if the electrolytic solution is hardened as shown in the first to third working examples, it is expected that the formation of a passivation layer can likewise be inhibited with a small amount of aluminum phosphate acting to modify the positive electrode surface that contacts the solid polymer electrolyte film.

INDUSTRIAL APPLICABILITY

According to the present invention, since the aluminate ester compound is used as a plasticizer for the lithium-ion battery solid polymer electrolyte, the safety, hazard, and other problems associated with the boric acid ester compound can be avoided, while achieving ionic conductivity comparable to that of the electrolyte using the boric acid ester compound. Using the aluminate ester compound offers the further advantage that not only thermal polymerization but photo-polymerization can also be selected as desired as the polymerization method for the solid polymer electrolyte, which greatly facilitates the fabrication of the lithium-ion battery. Furthermore, when an inorganic aluminum salt is added to the electrolyte, the charge/discharge capacity increases while suppressing the degradation of the charge/discharge cycle characteristics, thus increasing the usefulness of the lithium-ion battery in practical applications.

What is claimed is:

1. A lithium-ion battery solid polymer electrolyte comprising a lithium ion source, an organic polymer compound, and one or more kinds of aluminate ester compounds represented by the general formula (1)

(where $R_1$, $R_2$, and $R_3$ each independently represent a straight-chain or branched-chain lower alkyl group having one to eight carbon atoms, an alkenyl group having three to six carbon atoms, acryloyl, or methacryloyl; $OA_1$, $OA_2$, and $OA_3$ each independently represent an oxyalkylene group having two to four carbon atoms; l represents a number from 1 to 100; and m and n each independently represent a number from 0 to 100).

2. A lithium-ion battery solid polymer electrolyte as claimed in claim 1, wherein in said formula (1), $R_1$, $R_2$, and $R_3$ are identical to each other, each representing a straight-chain or branched-chain lower alkyl group having one to eight carbon atoms; $OA_1$, $OA_2$, and $OA_3$ are identical to each other, each representing an oxyalkylene group having two to four carbon atoms; and l, m, and n are identical to each other, each representing a number from 1 to 50.

3. A lithium-ion battery solid polymer electrolyte as claimed in claim 2, wherein in said formula (1), $R_1$, $R_2$, and $R_3$ each represent a methyl group; $OA_1$, $OA_2$, and $OA_3$ are identical to each other, each representing an oxyethylene group; and l, m, and n are identical to each other, each representing a number from 1 to 50.

4. A lithium-ion battery solid polymer electrolyte as claimed in claim 1, wherein said organic polymer compound contains alkyleneoxide having two to four carbon atoms as a repeating unit.

5. A lithium-ion battery solid polymer electrolyte as claimed in claim 4, wherein said organic polymer compound is crosslinked.

6. A lithium-ion battery solid polymer electrolyte as claimed in claim 1, further comprising an inorganic aluminum salt.

7. A lithium-ion battery solid polymer electrolyte as claimed in claim 6, wherein said inorganic aluminum salt is aluminum phosphate or aluminum sulfate.

8. A lithium-ion battery comprising a lithium-ion battery solid polymer electrolyte as claimed in claim 1.

* * * * *